United States Patent [19]

Tanigawa et al.

[11] Patent Number: 5,790,094
[45] Date of Patent: Aug. 4, 1998

[54] APPARATUS FOR DISPLAYING MACHINE OPERATION GUIDE

[75] Inventors: Hidekazu Tanigawa, Hirakata; Yoshio Nakano, Takatsuki; Seiji Tsuji, Osaka, all of Japan

[73] Assignee: Matsushita Electric Industrial Co. Ltd., Osaka-fu, Japan

[21] Appl. No.: 563,185

[22] Filed: Nov. 27, 1995

[30] Foreign Application Priority Data

Nov. 25, 1994 [JP] Japan ............................... 6-291708

[51] Int. Cl.$^6$ ............................................. G09G 5/08
[52] U.S. Cl. .................. 345/146; 345/115; 345/127; 348/564
[58] Field of Search ........................... 345/113, 146, 345/902, 115, 116, 127, 129, 131, 339, 340, 352; 348/239, 561, 563, 564, 565, 569, 586, 589

[56] References Cited

U.S. PATENT DOCUMENTS 4,992,782  2/1991  Sakamoto et al. .................. 345/116
5,589,893  12/1996  Gaughan et al. .................. 345/146
5,635,953  6/1997  Hayami et al. ..................... 345/146

FOREIGN PATENT DOCUMENTS 3286223  12/1991  Japan.
 415486   3/1992  Japan.
4205654   7/1992  Japan.
4237267   8/1992  Japan.

OTHER PUBLICATIONS

Manual for Color Television (TH–29VW10) pp. 60, 61, 72,73, Undated.

Primary Examiner—Regina Liang
Attorney, Agent, or Firm—Price, Gess & Ubell

[57] ABSTRACT

An apparatus is provided for displaying a machine operation guide as well as a window and an operation menu on a display not for overlapping each other. The user can select a function after watching the simulation of the function on the window, and can recognize a correspondence between a machine operation guide and an item of the operation menu.

27 Claims, 15 Drawing Sheets

Fig.2A

| PART IDENTIFIER | SHAPE | DISPOS-ITION | SIZE | CHARA-CTERS | CANDIDATES / PARTS | PERFORMANCE SELECTOR ||||| FOCUS |
|---|---|---|---|---|---|---|---|---|---|---|
| | | | | | | UPWARD | DOWNWARD | LEFTWARD | RIGHTWARD | PERFORM-ANCE | |
| MENU PANEL | ▢ | 10,10 | 110, 100 | | TITLE, DISPLAY CHANGE BUTTON, DISPLAY CHANGE BOX, FADE IN BUTTON, FADE OUT BUTTON, BRIGHTNESS + BUTTON, BRIGHTNESS – BUTTON, BRIGHTNESS BOX | | | | | | OFF |
| TITLE | | 20,20 | | MENU | | | | | | | ON |
| DISPLAY CHANGE BUTTON | ◯ | 25, 24 | 40,20 | DISPLAY CHANGE | | | MOVE FOCUS TO BRIGHTNESS + BUTTON | MOVE FOCUS TO FADE-IN BUTTON | | CHANGE DISPLAY SEE BOX | OFF |
| DISPLAY CHANGE BOX | ▭ | 65, 45 | 40,20 | | (CHANGE SCENE) TAPE COUNT MEMORY NO DISPLAY | | | | | | OFF |
| FADE-IN BUTTON | ◯ | 25, 65 | 40,20 | FADE IN | | MOVE FOCUS TO DISPLAY CHANGE BUTTON | MOVE FOCUS TO BRIGHTNESS – BUTTON | MOVE FOCUS TO FADE-OUT BUTTON | MOVE FOCUS TO FADE-OUT BUTTON | FADE-IN | OFF |
| FADE-OUT BUTTON | ◯ | 65, 65 | 40,20 | FADE OUT | | MOVE FOCUS TO DISPLAY CHANGE BUTTON | MOVE FOCUS TO BRIGHTNESS – BUTTON | MOVE FOCUS TO FADE-IN BUTTON | MOVE FOCUS TO FADE-IN BUTTON | FADE-OUT | OFF |
| BRIGHT-NESS + BUTTON | ◯ | 25, 90 | 20,20 | BRIGHT-NESS + | | MOVE FOCUS TO FADE-IN BUTTON | MOVE FOCUS TO DISPLAY CHA-NGE BUTTON | MOVE FOCUS TO BRIGHTNESS – BUTTON | MOVE FOCUS TO BRIGHTNESS – BUTTON | BRIGHTNESS +, SEE BOX | OFF |
| BRIGHT-NESS – BUTTON | ◯ | 80, 90 | 20,20 | BRIGHT-NESS – | | MOVE FOCUS TO FADE-OUT BUTTON | MOVE FOCUS TO DISPLAY CHA-NGE BUTTON | MOVE FOCUS TO BRIGHTNESS + BUTTON | MOVE FOCUS TO BRIGHTNESS + BUTTON | BRIGHTNESS –, SEE BOX | OFF |
| BRIGHT-NESS BOX | ◺ | 50, 90 | 40,20 | | 0~64 | | | | | | OFF |

FIG. 2B

| PART IDENTIFIER | SHAPE | DISPO-SITION | SIZE | CHAR-ACTERS | CANDIDATES / PARTS |
|---|---|---|---|---|---|
| MENU PANEL |  | 10,10 | 110,100 |  | title, display change button, display change box, fade-in button, fade-out button, brightness+button, brightness-button, brightness box |
| TITLE |  | 20,20 |  |  |  |
| DISPLAY CHANGE BUTTON |  | 25,24 | 40,20 | MENU |  |
| DISPLAY CHANGE BOX |  | 65,45 | 40,20 | DISPLAY CHANGE | △ (change scene) tape count memory no display |
| FADE-IN BUTTON |  | 25,65 | 40,20 | FADE IN |  |
| FADE-OUT BUTTON |  | 65,65 | 40,20 | FADE OUT |  |
| BRIGHTNESS + BUTTON |  | 25,90 | 20,20 | BRIGHTNESS + |  |
| BRIGHTNESS − BUTTON |  | 80,90 | 20,20 | BRIGHTNESS − |  |
| BRIGHTNESS BOX |  | 50,90 | 40,20 |  | 0~64 |

Fig. 8

| menu item | screen position(x,y,W,H) |
|---|---|
| display change button | (50,10,50,10) |
| remaining tape display button | (10,10,40,10) |
| blurring prevention button | (10,30,40,10) |

APPARATUS FOR DISPLAYING MACHINE OPERATION GUIDE

BACKGROUND OF THE INVENTION

(1) Field of the Invention

This invention relates to an apparatus for displaying a menu and a machine operation guide on a display of a video camera, television, etc.

(2) Description of the Prior Art

As conventional techniques for displaying machine operation guide with a menu on a display, two techniques as shown below may be introduced.

One of them is disclosed in Japanese Patent Publication No. 4-15486. According to the disclosure, when a user specifies Help function on a data input screen, a Help text (operation guide) is displayed on the screen. The Help text is encircled by a box which is connected by a line to a data input field into which the user is to input data. With such arrangement the user is guided to the data input field.

The other is disclosed on pages 60 to 61 and 72 to 73 of a manual of a color television (Serial Number TH-29VW10) which is made and sold by the applicant of the present invention. This technique utilizes On Screen Display (OSD), and displays a menu on the screen so that a user can choose functions such as controlling image and changing BS audio modes.

However, the former conventional technique just guides the user to a data input field. Accordingly, the user can input some data into the data input field, but cannot see an actual change which is caused by the data input. That means, if this technique is applied to an operation menu screen with which an image on a display is controlled, the actual change in the image cannot be seen.

As for the latter conventional technique, when the user displays the menu, a part of the screen is covered by the menu. Therefore, it is difficult for the user to see, during the operation, how or where the image is changing or will change.

SUMMARY OF THE INVENTION

The object of the present invention, in consideration of the above mentioned problems, is to provide an apparatus for displaying a menu and a machine operation guide by which a user can easily understand and choose a function.

The above object is fulfilled by an apparatus for displaying a machine operation guide on a display, comprising: a first display controlling unit for receiving image signals and displaying an image on the display; a second display controlling unit for displaying an operation menu with operational objects included therein in a partial area on the display; a reduced image generating unit for generating a reduced image of the image displayed on the display; a third display controlling unit for opening a window in an area not overlapping the operation menu on the display and displaying the reduced image on the window; a specifying unit for allowing an operator to select any of certain operational objects from the operation menu; a recognizing unit for recognizing an image simulation related to the operational object selected by the operator; a reduced image simulating unit for simulating the reduced image generated by the reduced image generating unit according to the image simulation recognized by the recognizing unit when the operator implements the operational object; and an image switching unit for switching the reduced image displayed on the window to the reduced image simulated by the reduced image simulating unit.

With such construction, the operational efficiency increases because the user can easily simulate a function before selecting the function in practice.

The recognizing unit of the apparatus for displaying a machine operation guide may comprise: an operation-menu-information storage unit for storing positional information on positions of the operational objects in the operation menu and performance information on performances corresponding to the operational objects; and a recognizing unit for reading performance information of an operational object and outputting the read performance information to a certain controlling unit after the operational object is selected by the specifying unit.

The above apparatus for displaying a machine operation guide may further comprise: a related information storage unit for storing pairs of an operational object in the operation menu and a preset display field, corresponding to the operational object, for displaying one of a message and a sign for the operator, wherein when a certain operational object is selected by the specifying unit the reduced image simulating unit reads corresponding one of the message and the sign from the related information storage unit and puts the one of the message and the sign into the preset display field on the reduced image generated by the reduced image generating unit.

In the above apparatus for displaying a machine operation guide, when one of the message and the sign is displayed on the window to urge the operator to implement a certain function, one of the first display controlling unit, the second display controlling unit, and the third display controlling unit may visually display a relation between the one of the message and the sign and the corresponding operational object.

In the above apparatus for displaying a machine operation guide, the displayed relation may be represented by one of: a line connecting the one of the message and the sign and the corresponding operational object; and a same color applied to both the one of the message and the sign and the corresponding operational object.

In the above apparatus for displaying a machine operation guide, the operational objects in the operation menu may at least include a screen brightness arrangement, a screen fade-in, and a screen fade-out.

In the above apparatus for displaying a machine operation guide, the specifying unit may comprise a reception unit for receiving one of a request for clearing the operation menu and a request for calling the operation menu on the display, wherein the second display controlling unit clears the window if the operation menu is cleared and opens the window if the operation menu is called.

With such construction, correspondence between a menu item and a machine operation guide is easily traced, and the operational efficiency further increases.

The apparatus for displaying a machine operation guide may further comprise: a related information storage unit for storing pairs of an operational object in the operation menu and a preset display position where one of a message and a sign for the operator is to be displayed, the preset display position corresponding to the operational object; and a fourth display controlling unit for reading from the related information storage unit the preset display position corresponding to the operational object selected by the specifying unit, and displays the preset display position by visually distinguishing it from the other area on the window opened by the third display controlling unit.

The above apparatus for displaying a machine operation guide may further comprise: a condition judging unit for judging whether a certain condition has been satisfied after the fourth display controlling unit has displayed the preset display position on the window, the certain condition being one of a state capable of displaying one of the message and the sign for the operator, and an operational object selected by the specifying unit, wherein when the condition judging unit judges that the certain condition has been satisfied, the reduced image simulating unit generates a reduced image by putting the one of the message and the sign into the preset display position on the generated reduced image.

With such construction, even if any message or sign is not displayed, a preset display field is displayed in relation with a menu item. It allows the user to anticipate a message or a sign, and the operational efficiency further increases.

The above object is also fulfilled by an apparatus for displaying a machine operation guide on a first display, the apparatus being connected to another machine installing a second display, comprising: a first display controlling unit for receiving image signals and displaying an image on a first display; a second display controlling unit for displaying an operation menu with operational objects included therein in a partial area on a second display; a reduced image generating unit for generating a reduced image of the image displayed by the first image display controlling unit; a third display controlling unit for opening a window on the first display and displaying the reduced image on the window; a specifying unit for allowing an operator to select any of certain operational objects from the operation menu displayed on the second display; a recognizing unit for recognizing an image simulation related to the operational object selected by the operator; a reduced image simulating unit for simulating the reduced image generated by the reduced image generating unit according to the image simulation recognized by the recognizing unit when the operator implements the operational object; and an image switching unit for switching the reduced image displayed on the window to the reduced image simulated by the reduced image simulating unit.

The above object is also fulfilled by an apparatus for displaying a machine operation guide on a display, comprising: a first display controlling unit for receiving image signals and displaying an image on a display; a second display controlling unit for displaying an operation menu with operational objects included therein in a partial area on the display; a specifying unit for allowing an operator to select one of certain operational objects from the operation menu; a related information storage unit for storing pairs of an operational object in the operation menu and a preset display position where one of a message and a sign for the operator is to be displayed, the preset display position corresponding to the operational object; and a third display controlling unit for reading one of a message and a sign corresponding to an operation object from the related information storage unit and for putting the one of the message and the sign into the preset display position not overlapping the operation menu on the display and visually displaying a relation between the one of the message and the sign and the operational object after the operation object is selected by the specifying unit.

With such construction, only a partial area of a display screen is covered. Also, even if any message or sign is not displayed, a preset display field is displayed in relation with a menu item to allow the user to anticipate a message or a sign. Therefore, the operational efficiency further increases.

The above object is also fulfilled by an apparatus for displaying a machine operation guide installed on a machine with a first display, the apparatus being connected to another machine installing a second display, comprising: a first display controlling unit for receiving image signals and displaying an image on a first display; a second display controlling unit for displaying an operation menu with operational objects included therein in a partial area on a second display; a reduced image generating unit for generating a reduced image of the image displayed by the first image display controlling unit; a third display controlling unit for opening a window in an area not overlapping the operation menu on the second display and displaying the reduced image on the window; a specifying unit for allowing an operator to select one of certain operational objects from the operation menu displayed on the second display; a recognizing unit for recognizing an image simulation related to the operational object selected by the operator; a reduced image simulating unit for simulating the reduced image generated by the reduced image generating unit according to the image simulation recognized by the recognizing unit when the operator implements the operational object; and an image switching unit for switching the reduced image displayed on the window on the second display to the reduced image simulated by the reduced image simulating unit.

With such construction, a display screen is not covered at all by any menu or window, and the operational efficiency increases.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 8 shows information stored in the menu-screen-relation storage unit.

DESCRIPTION OF THE PREFERRED EMBODIMENT

Preferred embodiments of the present invention are explained below with reference to the drawings.

<First Embodiment>

Figure 1:
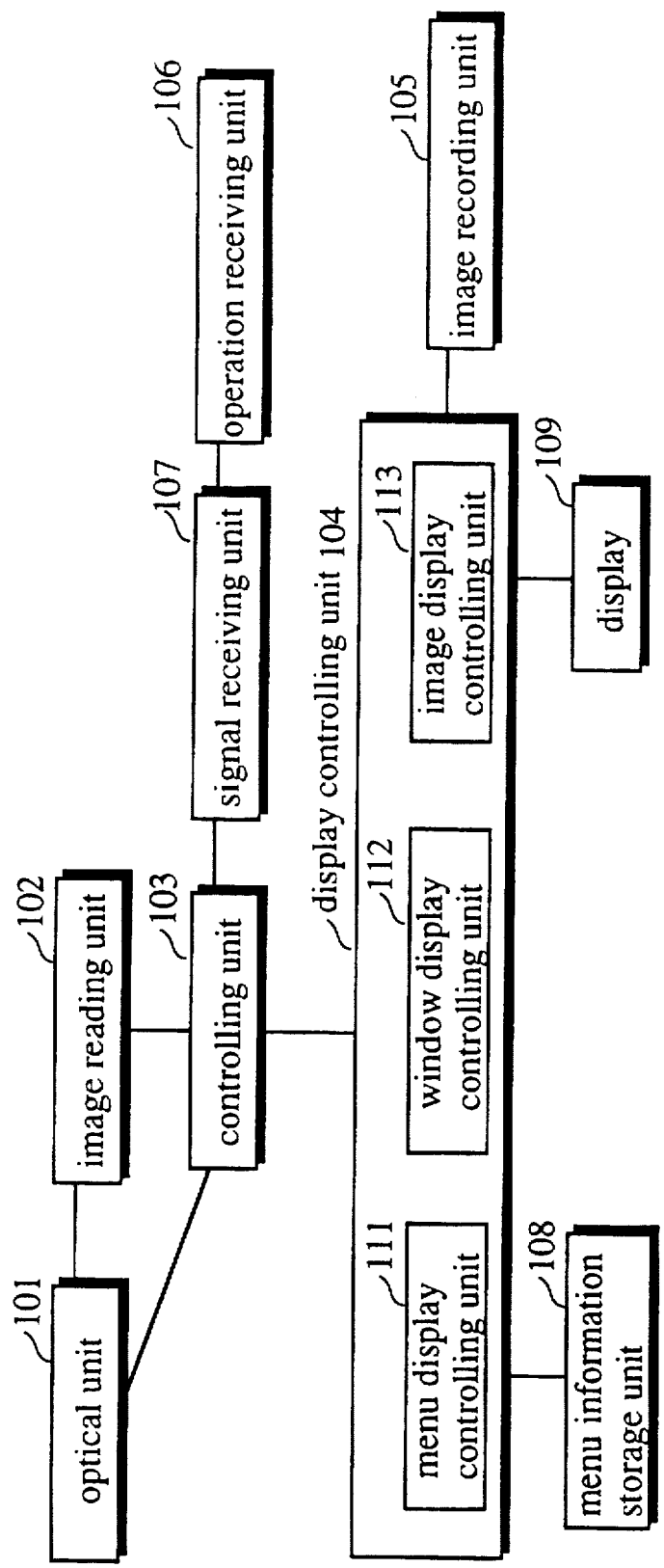
FIG. 1 shows a construction of a video camera using the machine operation guide display apparatus of the First Embodiment of the present invention.

FIG. 1 shows a construction of a video camera using the machine operation guide display apparatus of the First Embodiment of the present invention. The video camera includes optical unit 101, image reading unit 102, controlling unit 103, display controlling unit 104, image recording unit 105, operation receiving unit 106, signal receiving unit 107, menu information storage unit 108, and display 109.

Display controlling unit 104 for controlling display 109 includes menu display controlling unit 111, window display controlling unit 112, and image display controlling unit 113.

Optical unit 101, including lenses (not shown in the figures), receives reflected light from a subject under the control of controlling unit 103 and projects an image of the subject on image reading unit 102.

Image reading unit 102, including a Charge Coupled Device (CCD), detects the image projected by optical unit 101, converts the image into image signals to be output to controlling unit 103.

Controlling unit 103, upon receiving the image signals from image reading unit 102, judges whether a menu is being displayed: if displayed, outputs the image signals to window display controlling unit 112 and image display controlling unit 113; and if not displayed, outputs the image signals to image display controlling unit 113.

Also, controlling unit 103 receives an operational signal from signal reception unit 107 and judges the type of the operational signal which is divided into the following: videotaping start signal, menu display start signal, image change signal, menu change signal, menu display end signal, and videotaping end signal. Then, controlling unit 103 operates as follows according to the type of the operational signal:

videotaping start signal: activates optical unit 101 and image reading unit 102;

menu display start signal: judges whether a menu is being displayed, and if not displayed, transfers the menu display start signal to menu displaying unit 111 and sends a window display instruction to small screen display controlling unit 112;

image change signal: judges whether a menu is being displayed: if displayed, transfers the image change signal to window display controlling unit 112; if not displayed, transfers the image change signal to image display controlling unit 113;

menu change signal: judges whether a menu is being displayed, and if displayed, transfers the menu change signal to menu display controlling unit 111; and menu display end signal: judges whether a menu is being displayed, and if displayed, transfers the menu display end signal to menu display controlling unit 111 and window display controlling unit 112.

Image recording unit 105 stores image signals input by image display controlling unit 113, the image signals being of an image to be displayed on display 109.

Operation receiving unit 106 receives a type of an operation selected by the user and sends a corresponding signal to signal receiving unit 107. For example, the operation may be divided into the following types: videotaping start, menu display start, image change, menu change, menu display end, and videotaping end.

Signal receiving unit 107 transfers a signal from operation receiving unit 106 to controlling unit 103.

Figure 2:
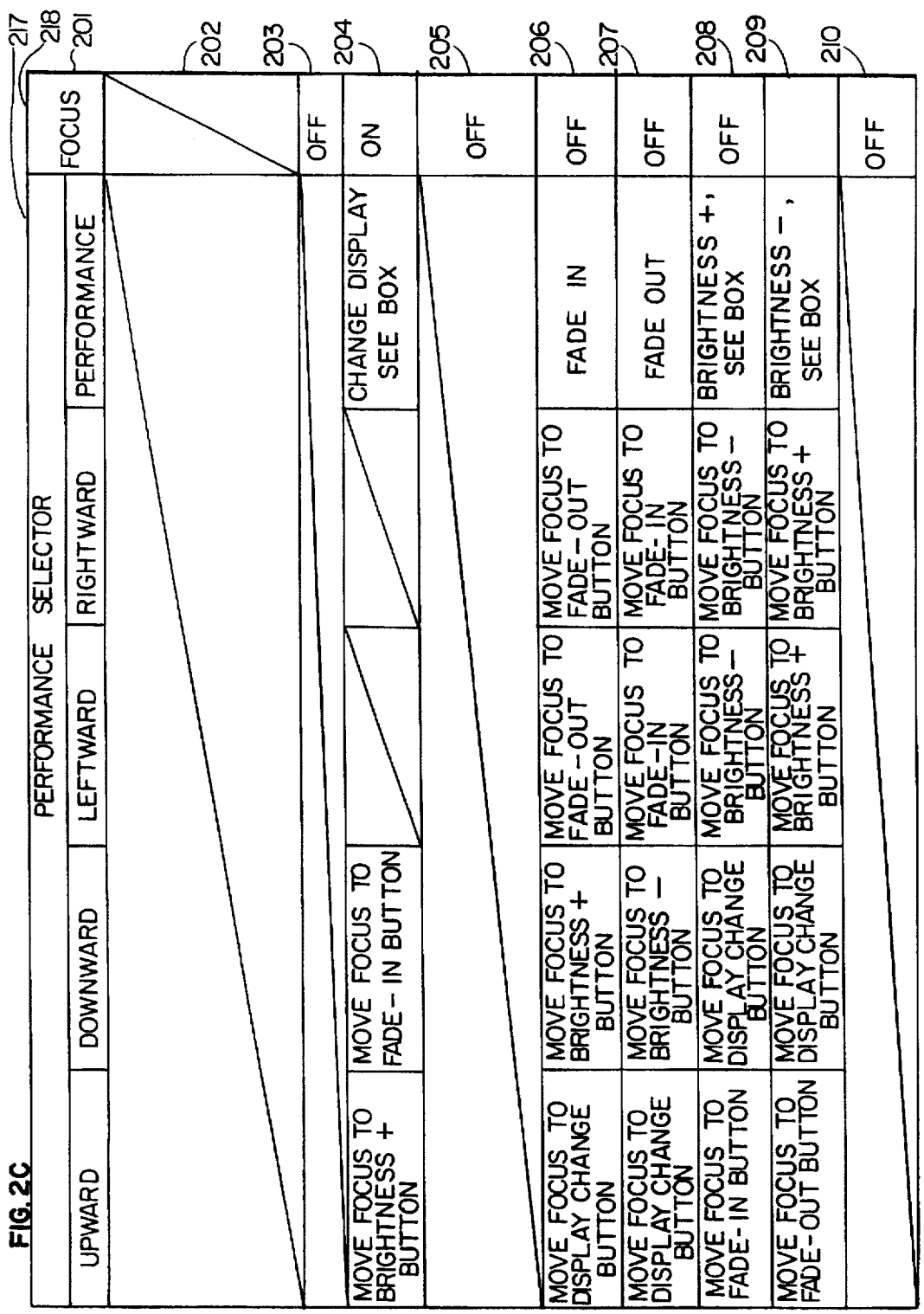
FIG. 2A shows menu information stored in the menu information storage unit.
FIG. 2B is an enlarged left-hand part of FIG. 2A.
FIG. 2C is an enlarged right-hand part of FIG. 2A.

Menu information storage unit 108 includes a storage device such as magnetic disk or ROM and stores in advance menu information concerning the operation menu as shown in FIG. 2A. Menu information includes attributes stored in first record 201, and attribute values stored in second record 202 to tenth record 210. The attributes stored in first record 201 are, from left to right, part identifier 211, shape 212, disposition 213, size 214, characters 215, candidates/parts 216, performance 217, and focus 218. FIG. 2A is divided into Figs.2B and 2C which have been enlarged for the convenience of readers.

Part identifier 211 identifies a part, such as a menu panel, several kinds of buttons, etc. Shape 212 specifies a shape of the part. Disposition 213, a pair of XY coordinate-values, specifies a point on the screen of display 109 from where the part begins to be disposed. Size 214 specifies the size of the part, that is, each length of the sides of the part in the directions of X and Y respectively. Characters 215 shows the characters displayed in the part. Candidates/parts 216 shows items displayed in a box and shows parts displayed in a menu panel, the box being a part, the menu panel being a frame surrounding the operation menu. Performance 217 shows performances of a focused part, the focused part being a part selected for operation. Focus 218 specifies a focused part: "ON" indicates the part is being focused; "OFF" not focused.

Display 109, including a display such as liquid crystal panel, CRT, etc., displays image signals as an image under the control of image display controlling unit 113, displays an operation menu under the control of menu display controlling unit 111, and displays an image on a window under the control of window display controlling unit 112.

Figure 3:
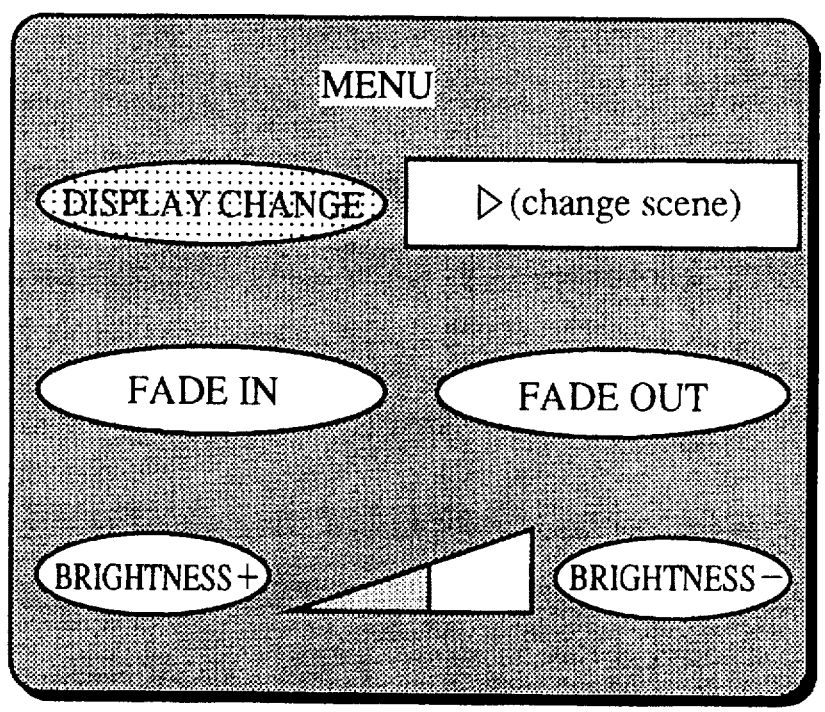
FIG. 3 is an operation menu displayed on the screen.

Menu display controlling unit 111 operates as follows according to a signal sent from controlling unit 103:

menu display start signal: reads menu information, attribute values stored in second record 202 to tenth record 210 in detail, from menu information storage unit 108, and displays an operation menu on display 109. As a result, such an operation menu as shown in FIG. 3 is displayed.

menu change signal: changes the temporarily stored menu information and displays the changed menu on display 109. For example, if unit 111 receives a menu change signal indicating the focus should move downwards, it changes the focus of "fade-in button" from "OFF" to "ON", and that of "display change button" from "ON" to "OFF", as the attribute values of performance selector 217 in FIG. 2A and 2C indicate.

Figure 4:
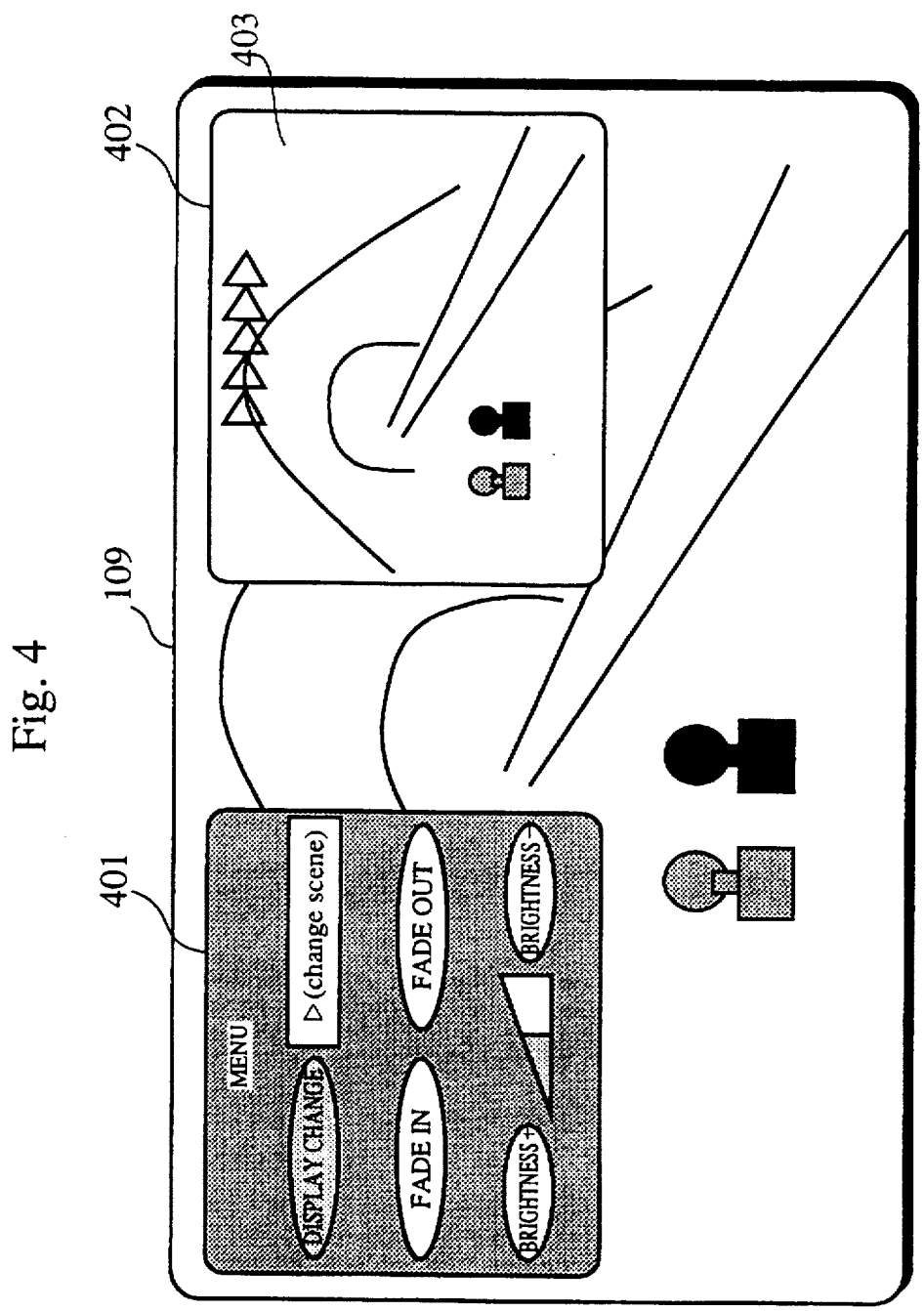
FIG. 4 is an operation menu and a window displayed on the screen.
Figure 5:
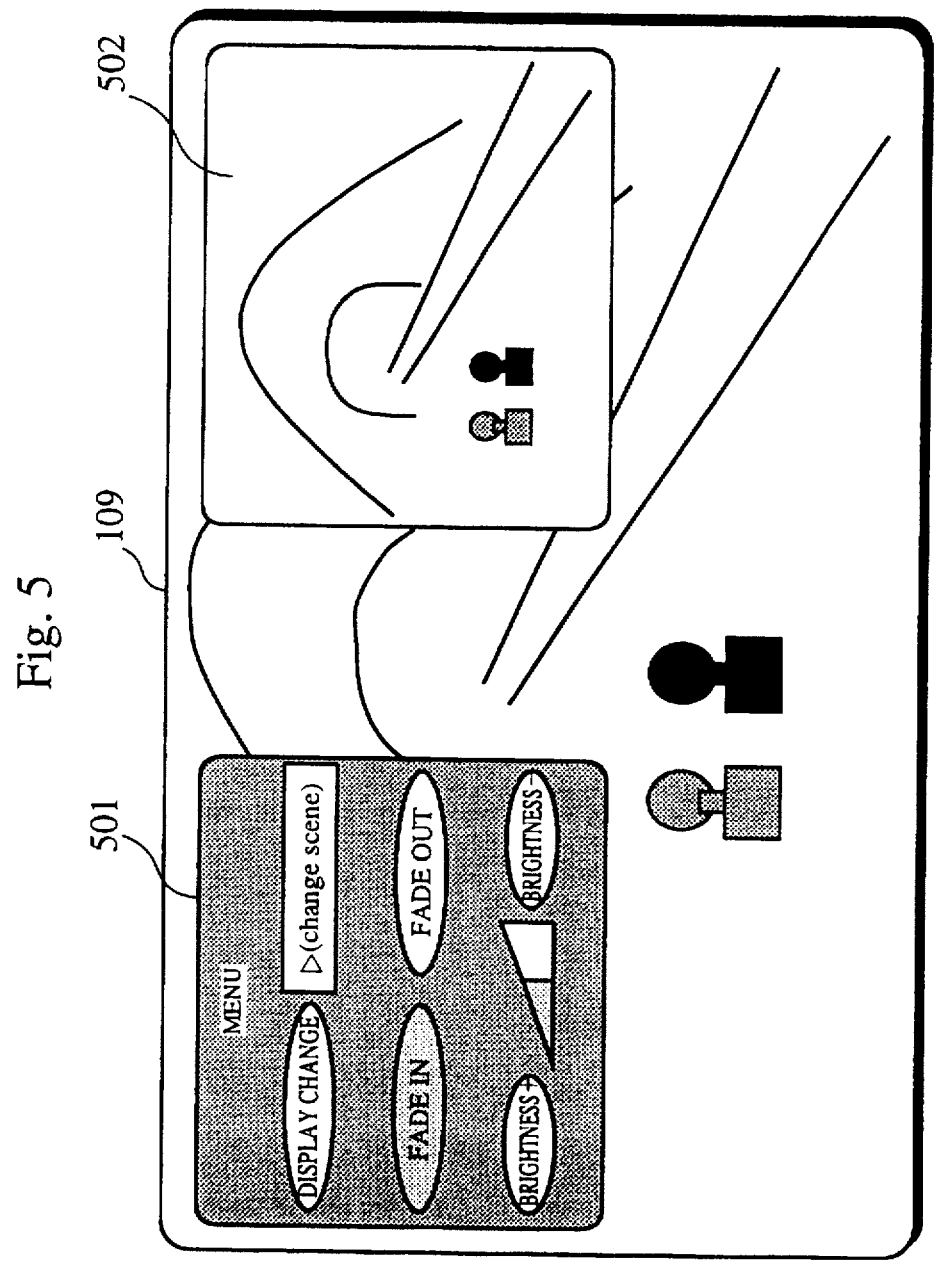
FIG. 5 is an operation menu and a window displayed on the screen.

As a result, operation menu 401 shown in FIG. 4 is replaced by operation menu 501 shown in FIG. 5.

menu display end signal/videotaping end signal: stops displaying an operation menu on display 109.

Window display controlling unit 112 operates as follows according to what it receives from controlling unit 103:

window display instruction: generates frame 402 for window 403 in an area which does not overlap operation menu 401 on the screen of display 109, and displays an image on window 403 on the same screen after converting image signals received from controlling unit 103 into the image reduced to the size of the window.

image change signal: changes the image displayed on window 403 according to the received signal. For example, on a screen as shown in FIG. 4, if small screen display controlling unit 112 receives a fade-out signal from controlling unit 103, the image displayed on window 403 is faded out as a simulation of the function. For another example, the screen of FIG. 5 indicates that the user has selected the fade-in button. Then, controlling unit 103 sends a fade-in signal to window controlling unit 112 to fade in the image displayed on window 502 as a simulation of the function. menu display end signal/videotaping end signal: stops displaying frame 402 and the image on the window on display 109.

Image display controlling unit 113 operates as follows according to what it receives from controlling unit 103:

image signals: converts the image signals into an image, displays the image on display 109, and makes image recording unit 105 record the image.

image change signal: changes the image according to the message of the signal, displays the changed image on display 109, and makes image recording unit 105 record the changed image.

videotaping end signal: stops displaying the image on display 109 and makes image recording unit 105 end recording.

Now the operation of the present invention in the First Embodiment is explained with reference to a flowchart shown in FIG. 6. Note that general operations such as displaying and videotaping are not explained here because they are not relevant to the present subject. In a conventional technique, optical unit 101 would receive reflected light from a subject and project an image of the subject on image reading unit 102. Image reading unit 102 would detect the image projected by optical unit 101 and convert the image into image signals to be output to controlling unit 103. Controlling unit 103 would transfer the image signals to image display controlling unit 113. Image display controlling unit 113 would display the image of the image signals on display 109, and image recording unit 105 would record the image signals. The detail of this operation is disclosed in Japanese Laid-Open Patent Application No.4-237267.

Figure 6:
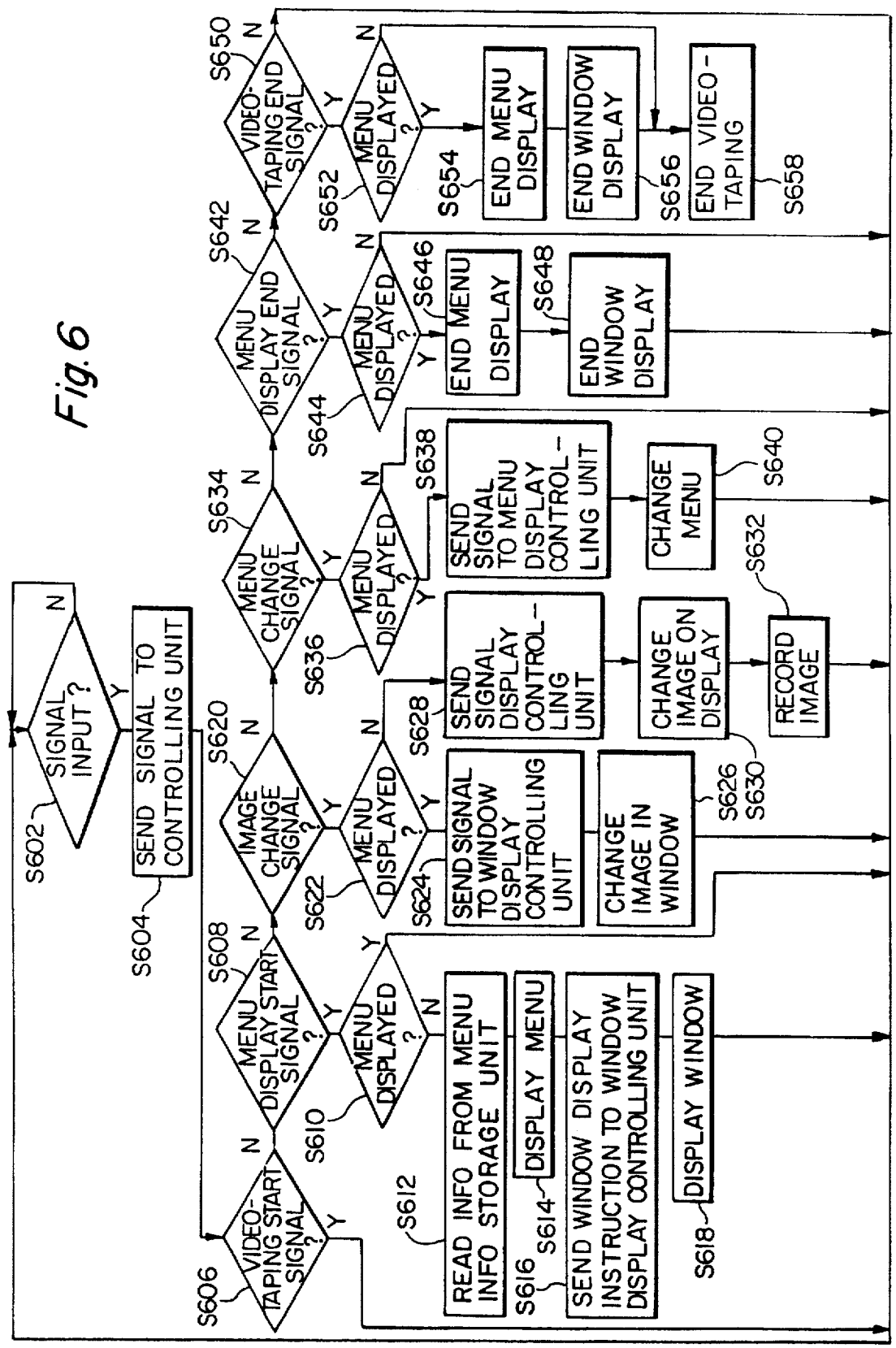
FIG. 6 is a flowchart showing how the machine operation guide display apparatus of the First Embodiment of the present invention operates in a video camera.

Referring to FIG. 6, there is shown a flow chart of a preferred implementation of the present invention.

Initially, at step 602 (S602), signal receiving unit 107 waits for a signal to be input by operation receiving unit 106 during a general operation such as image displaying or videotaping. Signal receiving unit 107 transfers a received signal to controlling unit 103 at S604.

At S606, controlling unit 103 judges whether the received signal is a videotaping start signal: if it is, control returns to S602 with the current videotaping state maintained; if it is not, control moves to S608.

At S608, controlling unit 103 judges whether it is the menu display start signal: if it is not, control moves to step 620; if it is, the signal is transferred to menu display controlling unit 111. Then, at S610, it is judged whether a menu is being displayed: if displayed, control returns to S602; if not, at S612, menu display controlling unit 111 reads menu information from menu information recording unit 108, generates an operation menu according to the menu information and displays it on display 109 at S614. Then controlling unit 103 sends the window display instruction to window display controlling unit 112 at S616. On receiving the instruction, window display controlling unit 112 generates a frame for a window on display 109, converts image signals sent from control unit 103 into an image and displays the image in the frame at S618. Then, control returns to S602.

At S620, controlling unit 103 judges whether the received signal is an image change signal: if it is not, control moves to S634; if it is, control moves to S622. At S622, it is judged whether a menu is being displayed: if not displayed, control moves to S628; if displayed, an image change signal is sent to window display controlling unit 112 at S624. On receiving the signal, window display controlling unit 112 changes the image in the window according to the received image change signal at S626. Then, control returns to S602.

At S628, controlling unit 103 sends an image change signal to image display controlling unit 113. Then the image is changed based on the image change signal and the changed image is displayed on display 109 at S630. Image recording unit 105 records the image at S632, and control returns to S602.

At S634, controlling unit 103 judges whether the received signal is a menu change signal: if it is not, control moves to S642; if it is, control moves to S636. At S636, it is judged whether a menu is being displayed: if not displayed, control returns to S602; if displayed, the menu change signal is transferred to menu display controlling unit 111 at S638. The operation menu is changed based on the menu change signal and the changed menu is displayed on display 109 at S640. Control returns to S602.

At S642, controlling unit 103 judges whether the received signal is a menu display end signal: if it is not, control moves to S650; if it is, control moves to S644. At S644, it is judged whether a menu is being displayed: if not displayed, control returns to S602; if displayed, menu display controlling unit 111 ends displaying the operation menu on display 109 at S646. Then at S648, window display controlling unit 112 ends displaying image on window, and control returns to S602.

At S650, controlling unit 103 judges whether the received signal is a videotaping end signal: if it is not, control returns to S602; if it is, control moves to S652. At S652, it is judged whether a menu is being displayed: if not displayed, control moves to S658; if displayed, menu display controlling unit 111 ends displaying operation menu on display 109 at S654, then window display controlling unit 112 ends displaying image on window at S656. At S658, image recording unit 105 ends videotaping.

As explained above, the present invention increases user's operational efficiency, because the user can select and simulate a function and see a simulation image on a window during an operation of a video camera.

<Second Embodiment>

Figure 7:
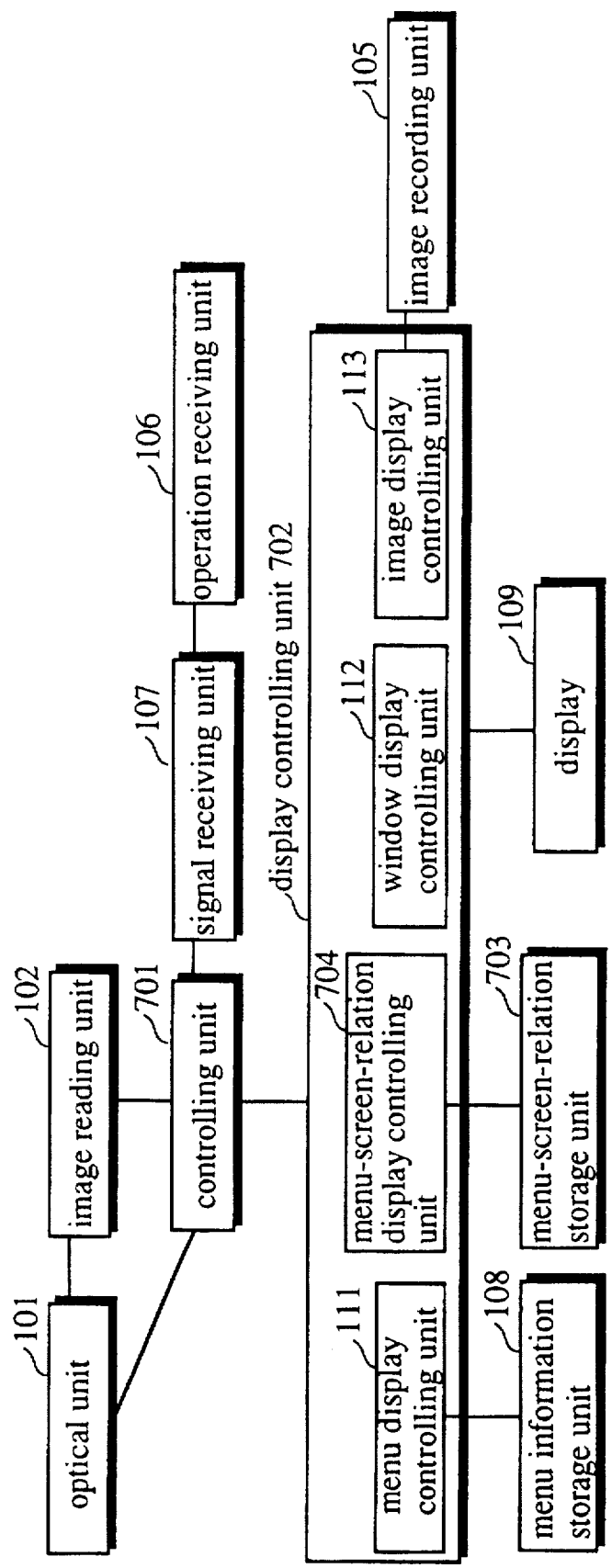
FIG. 7 shows a construction of a video camera using the machine operation guide display apparatus of the Second Embodiment of the present invention.

FIG. 7 shows a construction of a video camera which has installed the machine operation guide display apparatus of the Second Embodiment of the present invention. The video camera includes optical unit 101, image reading unit 102, controlling unit 701, display controlling unit 702, image recording unit 105, operation receiving unit 106, signal receiving unit 107, menu information storage unit 108, display 109, and menu-screen-relation storage unit 703.

Basic construction of the Second Embodiment is the same as that of the First Embodiment. Therefore, common components having the same numbers are not explained in this embodiment.

Display controlling unit 702 includes menu display controlling unit 111, window display controlling unit 112, image display controlling unit 113, and menu-screen-relation display controlling unit 704.

Controlling unit 701 has functions as shown below which controlling unit 103 of the First Embodiment does not have.

Controlling unit 701 sends a machine-operation-guide concerning instruction to menu-screen-relation display controlling unit 704 when a menu change signal is sent from signal receiving unit 107 and a menu is being displayed on the screen of display 109.

Menu-screen-relation storage unit 703 stores information on correspondence between items of the operation menu and positions on the screen as shown in FIG. 8. The items are the parts, which can be identified by the part identifiers in FIG. 2A. For example, item "display change button" is the part recorded at fourth record 204 in FIG. 2A. A position on the screen indicates a position where a machine operation guide (including information on machine states) is displayed on a window, and are represented by coordinate values for a disposition starting point, x and y, width W and height H. The machine operation guide is a message for the user or a sign, and the sign is mainly an icon. Note that "remaining tape display button" and "blurring prevention button" which appear in FIG. 8 are not shown in FIG. 2A, 2B, or 2C.

Figure 9A:
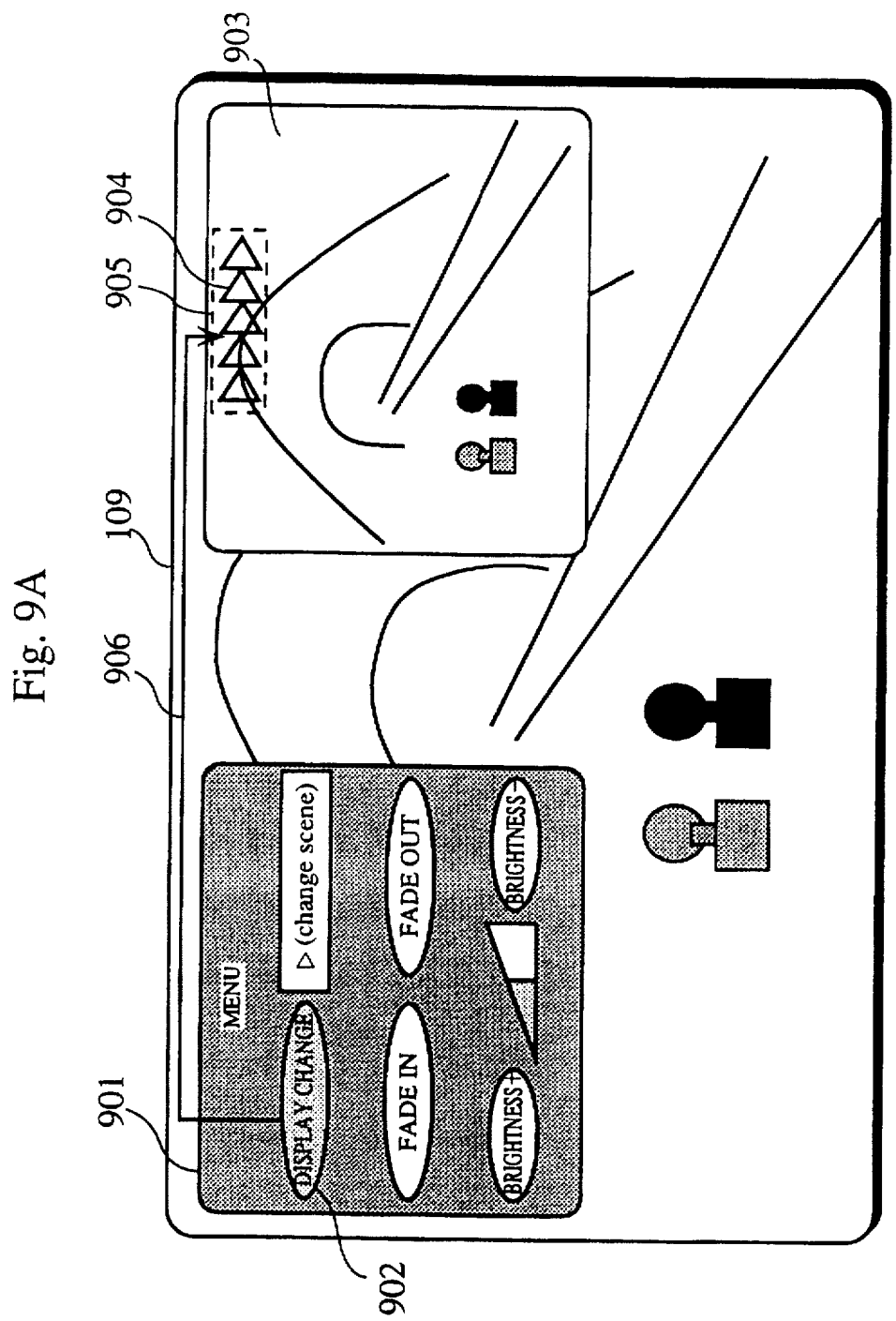
FIG. 9A is an operation menu and a window displayed on the screen.

For example, menu-screen-relation storage unit 703 stores information on correspondence between item 902 "display change button" of operation menu 901 and a position of machine operation guide 904 on window 903 as shown in FIG. 9A.

Menu-screen-relation display controlling unit 704, on receiving the machine-operation-guide concerning instruction from controlling unit 701, fetches a part identifier of a currently focused part from menu display controlling unit 111, reads the related information in menu-screen-relation storage unit 703, detects the position on the screen, and displays broken-line rectangular 905 encircling machine operation guide 904, and arrow 906 connecting item 902 to rectangular 905 on display 109. At the same time, menu-screen-relation display controlling unit 704 instructs small-screen display controlling unit 112 to display a machine operation guide.

Figure 9B:
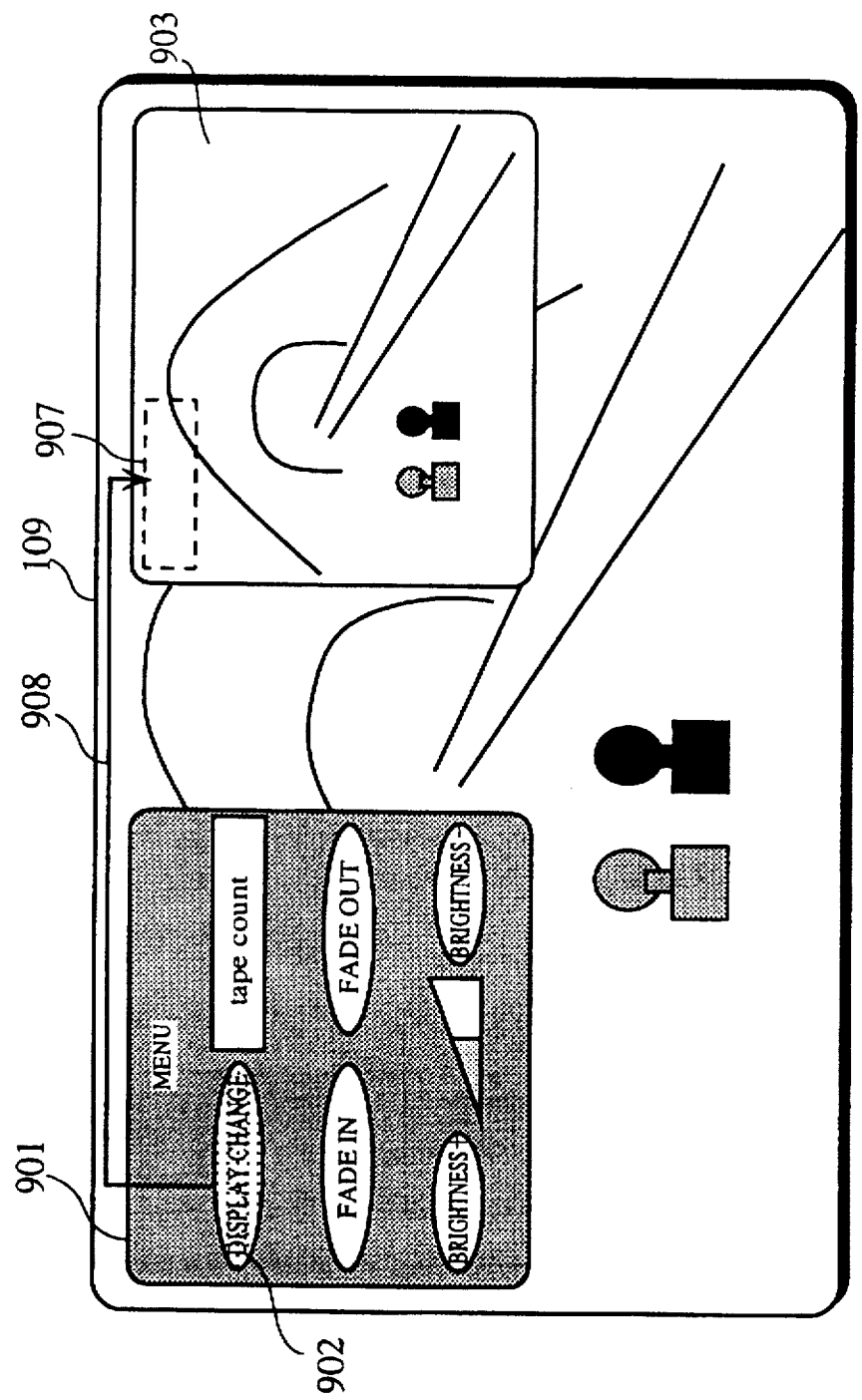
FIG. 9B is an operation menu and a window displayed on the screen.

While the screen of FIG. 9A displays machine operation guide 904, the screen of FIG. 9B does not. Remaining tape data (tape count) is to be displayed as the machine operation guide but has not been displayed yet. However, broken-line rectangular 907, encircling a preset display field where a machine operation guide is to be displayed, and arrow 908 connecting item 902 to rectangular 907 are displayed. These measures are taken because it takes time in calculating the remaining tape before the result is displayed. As a result, whether a machine operation guide is displayed or not, a preset display field is displayed in relation with a menu item.

Window display controlling unit 112 displays machine operation guide 904 at the detected position on window 903 when it receives an instruction for displaying machine operation guide from menu-screen-relation display controlling unit 704.

Figure 10:
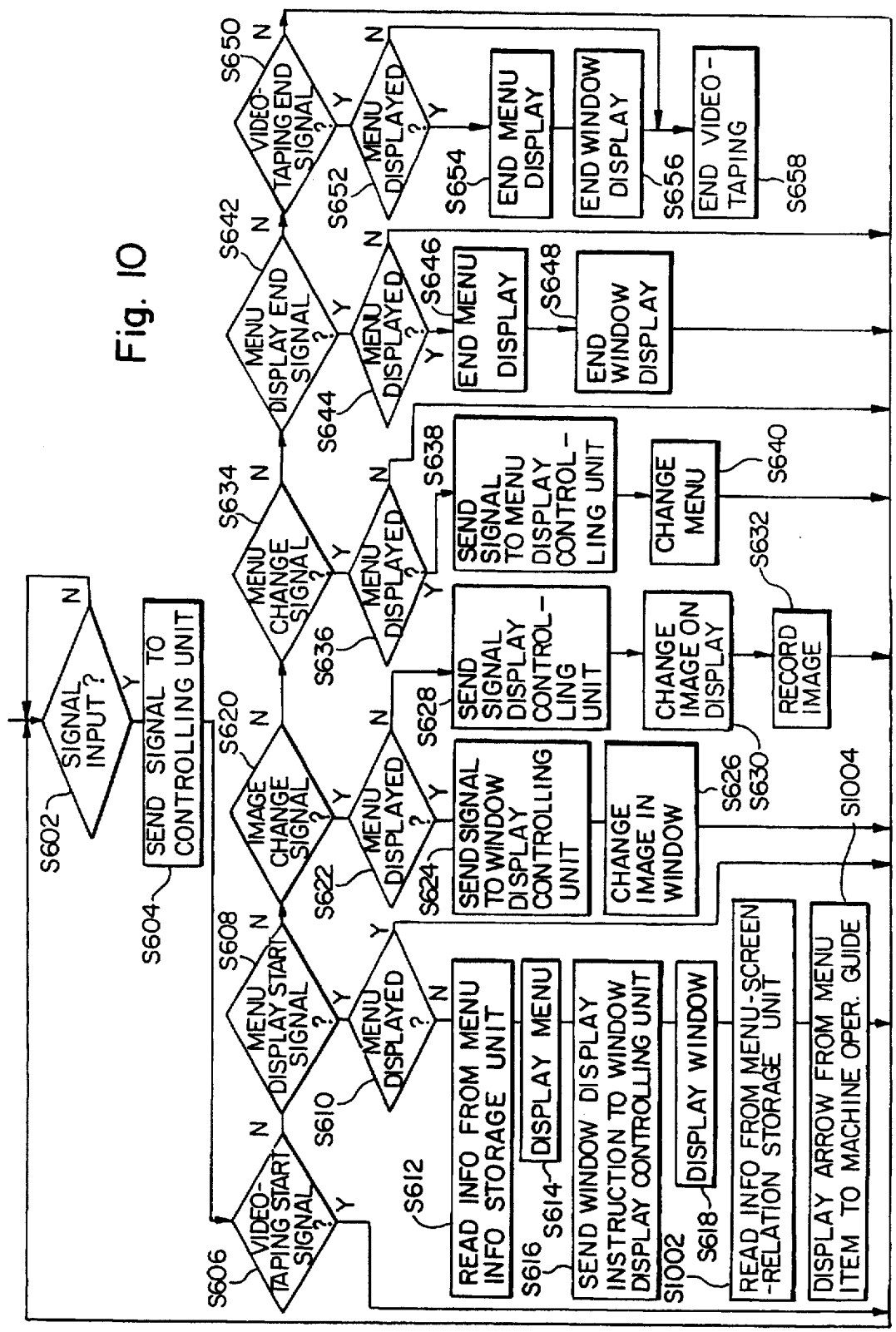
FIG. 10 is a flowchart showing how the machine operation guide display apparatus of the Second Embodiment of the present invention operates in a video camera.

The operation of the present invention in the Second Embodiment is now explained with reference to the flowchart shown in FIG. 10. Note that common steps with the same numbers as those of the First Embodiment are not explained in this embodiment.

At S1002 after S618 or S640, menu-screen-relation display controlling unit 704, on receiving a machine-operation-guide concerning instruction from controlling unit 701, fetches a menu item from menu display controlling unit 111, reads information stored in menu-screen-relation storage unit 703, and detects a position on the screen corresponding to the menu item. Then, menu-screen-relation display controlling unit 704 displays a broken-line rectangular encircling a preset display field or a displayed machine operation guide, and displays an arrow connecting the menu item to the rectangular at S1004. Then control returns to S602. This function increases the operational efficiency because the user can see the correspondence between a menu item and a machine operation guide.

As another embodiment of the present invention, the menu may be displayed on another display equipment, e.g. a display of a handy personal computer connected to the present apparatus, while in the First and Second Embodiments the operation menu and the window are displayed on the same screen with care not for overlapping each other. In such case, the same color may be applied to a focused menu item on a screen of one display and a machine operation guide on a screen of the other display so that the user can easily recognize the correspondence between them.

As still another embodiment of the present invention, the menu display controlling unit and the window display controlling unit may display both operation menu and window on another display.

As a further embodiment of the present invention, in a microwave range having a Liquid Crystal Display (LCD), operation menu of a cookbook may be displayed on the LCD and a simulated operation may be displayed on another display, e.g. television.

<Third Embodiment>

Figure 11:
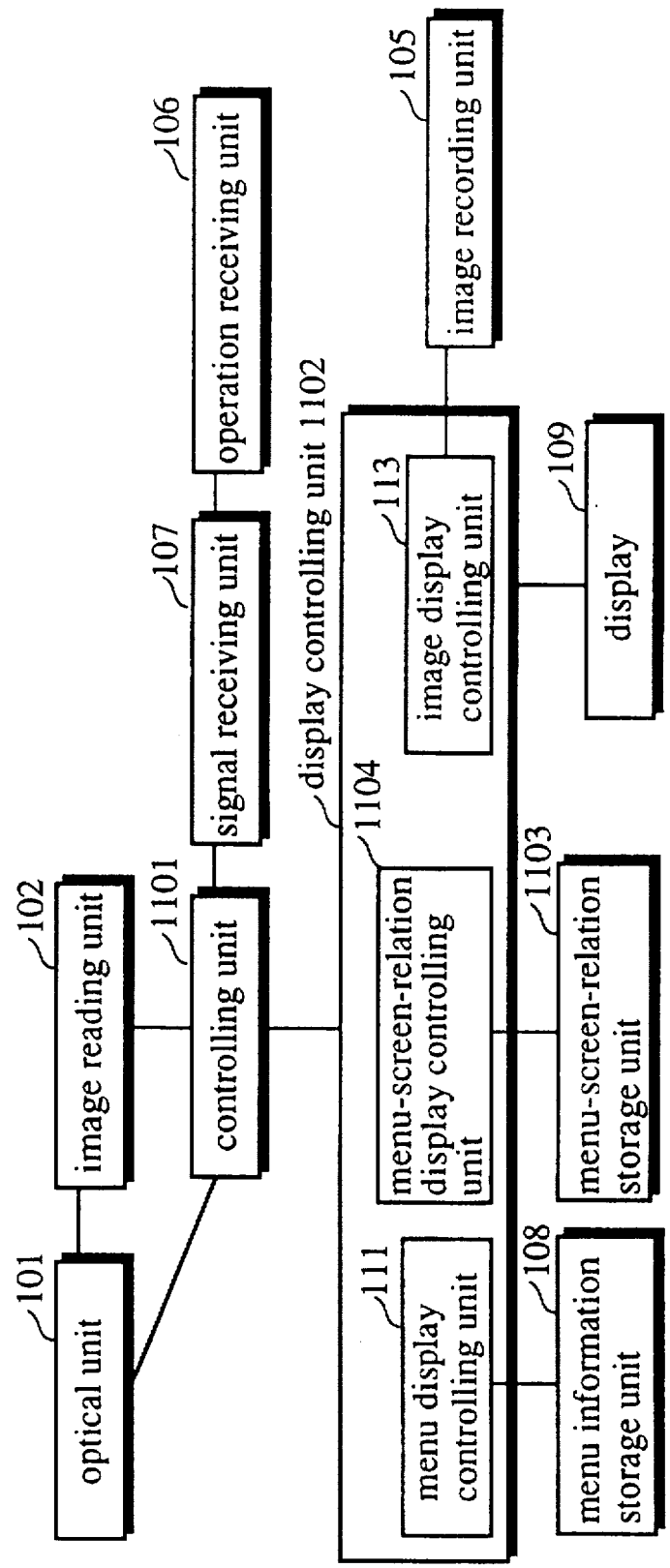
FIG. 11 shows a construction of a video camera using the machine operation guide display apparatus of the Third Embodiment of the present invention.
Figure 12:
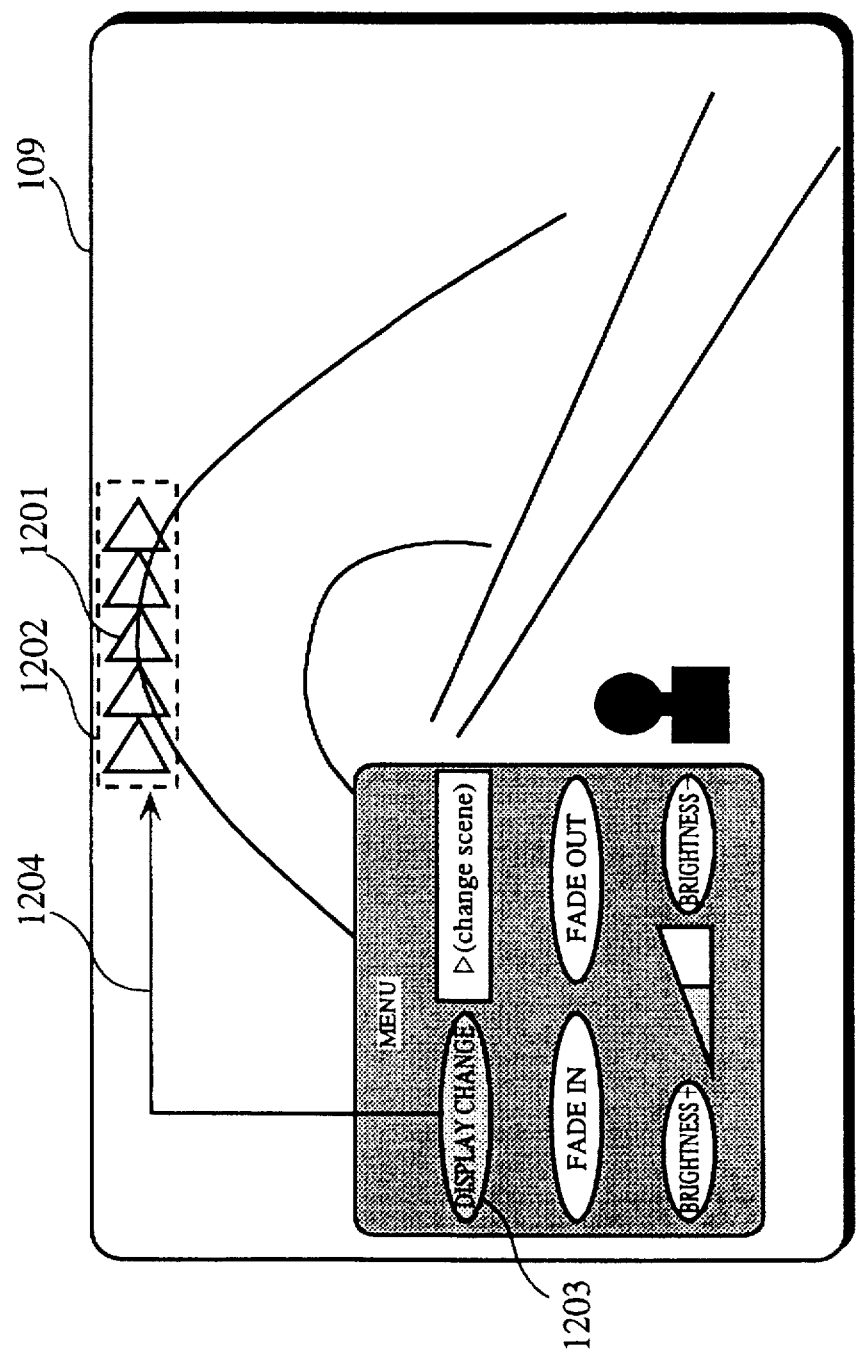
FIG. 12 is an operation menu and a window displayed on the screen.

FIG. 11 shows a construction of a video camera using the machine operation guide display apparatus of the Third Embodiment of the present invention. The video camera includes optical unit 101, image reading unit 102, controlling unit 1101, display controlling unit 1102, image recording unit 105, operation receiving unit 106, signal receiving unit 107, menu information storage unit 108, and display 109.

Display controlling unit 1102 includes menu display controlling unit 111, window display controlling unit 112, image display controlling unit 113, menu-screen-relation storage unit 1103 and menu-screen-relation display controlling unit 1104.

Basic construction of the Third Embodiment is the same as that of the First Embodiment. Therefore, common components having the same numbers are not explained in this embodiment.

Note that controlling unit 1101 differs from controlling unit 103 in that it does not include window display controlling unit 112.

Controlling unit 1101 sends the machine-operation-guide concerning instruction to menu-screen-relation display controlling unit 1104 when a menu change signal is sent from signal receiving unit 107 and a menu is being displayed.

Menu-screen-relation storage unit 1103 stores information on correspondence between items of the operation menu and positions on the screen as shown in FIG. 8. Note however that while the values represent the positions on window 903 (FIG. 9) in the Second Embodiment, the values represent the positions on the screen of display 109 in the Third Embodiment.

Menu-screen-relation display controlling unit 1104, on receiving the machine-operation-guide concerning instruction from controlling unit 1101, fetches a menu item to be operated from menu display controlling unit 111, reads information in menu-screen-relation storage unit 1103, detects the position on the screen, and displays broken-line rectangular 1202 encircling machine operation guide 1201, and arrow 1204 connecting item 1203 to rectangular 1202 on display 109.

Since the operation of the Third Embodiment is almost the same as that of the First or Second Embodiment, it is not explained in this embodiment.

As another embodiment of the present invention, while in the Third Embodiment a broken-line rectangular encircling a machine operation guide is connected by an arrow to a menu item, the same color may be applied to the menu item and the machine operation guide so that the user can easily recognize the correspondence between them.

As still another embodiment of the present invention, while in the Second and Third Embodiments only a menu item to be operated is connected to a machine operation guide, all the menu items and the corresponding machine operation guides may be visually indicated.

As a further embodiment of the present invention, while the present invention has been particularly explained with reference to a video camera in these Embodiments, the present invention may be applied to other equipments installing a display such as television, handy personal computer, etc.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An apparatus for displaying a machine operation guide on a display, comprising:

a first display controlling means for receiving image signals and displaying an image on the display;

a second display controlling means for displaying an operation menu with operational objects included therein in a partial area on the display;

a reduced image generating means for generating a reduced image of the image displayed on the display;

a third display controlling means for opening a window in an area not overlapping the operation menu on the display and displaying the reduced image on the window;

a specifying means for allowing an operator to select any of certain operational objects from the operation menu;

a recognizing means for recognizing an image simulation related to the operational object selected by the operator;

a reduced image simulating means for simulating the reduced image generated by the reduced image generating means according to the image simulation recognized by the recognizing means when the operator implements the operational object; and an image switching means for switching the reduced image displayed on the window to the reduced image simulated by the reduced image simulating means.

2. The apparatus for displaying a machine operation guide as defined in claim 1 wherein the recognizing means comprises:

an operation-menu-information storage unit for storing positional information on positions of the operational objects in the operation menu and performance information on performances corresponding to the operational objects; and a recognizing unit for reading performance information of an operational object and outputting the read performance information to a certain controlling means after the operational object is selected by the specifying means.

3. The apparatus for displaying a machine operation guide as defined in claim 2 further comprises:

a related information storage means for storing pairs of an operational object in the operation menu and a preset display field, corresponding to the operational object, for displaying one of a message and a sign for the operator, wherein when a certain operational object is selected by the specifying means the reduced image simulating means reads corresponding one of the message and the sign from the related information storage means and puts the one of the message and the sign into the preset display field on the reduced image generated by the reduced image generating means.

4. The apparatus for displaying a machine operation guide as defined in claim 3, wherein when one of the message and the sign is displayed on the window to urge the operator to implement a certain function, one of the first display controlling means, the second display controlling means, and the third display controlling means visually displays a relation between the one of the message and the sign and the corresponding operational object.

5. The apparatus for displaying a machine operation guide as defined in claim 4, wherein the displayed relation is represented by one of:

a line connecting the one of the message and the sign and the correspdoning operational object; and a same color applied to both the one of the message and the sign and the corresponding operational object.

6. The apparatus for displaying a machine operation guide as defined in claim 5, wherein the operational objects in the operation menu at least include a screen brightness arrangement, a screen fade-in, and a screen fade-out.

7. The apparatus for displaying a machine operation guide as defined in claim 6, wherein the specifying means comprises a reception unit for receiving one of a request for clearing the operation menu and a request for calling the operation menu on the display, wherein the second display controlling means clears the window if the operation menu is cleared and opens the window if the operation menu is called.

8. The apparatus for displaying a machine operation guide as defined in claim 4, wherein the operational objects in the operation menu at least include a screen brightness arrangement, a screen fade-in, and a screen fade-out.

9. The apparatus for displaying a machine operation guide as defined in claim 8, wherein the specifying means comprises a reception unit for receiving one of a request for clearing the operation menu and a request for calling the operation menu on the display, wherein the second display controlling means clears the window if the operation menu is cleared and opens the window if the operation menu is called.

10. The apparatus for displaying a machine operation guide as defined in claim 2 further comprises:

a related information storage means for storing pairs of an operational object in the operation menu and a preset display position where one of a message and a sign for the operator is to be displayed, the preset display position corresponding to the operational object; and a fourth display controlling means for reading from the related information storage means the preset display position corresponding to the operational object selected by the specifying means, and displays the preset display position by visually distinguishing it from the other area on the window opened by the third display controlling means.

11. The apparatus for displaying a machine operation guide as defined in claim 10 further comprises:

a condition judging means for judging whether a certain condition has been satisfied after the fourth display controlling means has displayed the preset display position on the window, the certain condition being one of a state capable of displaying one of the message and the sign for the operator, and an operational object selected by the specifying means, wherein when the condition judging means judges that the certain condition has been satisfied, the reduced image simulating means generates a reduced image by putting the one of the message and the sign into the preset display position on the generated reduced image.

12. The apparatus for displaying a machine operation guide as defined in claim 11 wherein a line connects the operational object and the preset display position.

13. An apparatus for displaying a machine operation guide on a first display, the apparatus being connected to another machine installing a second display, comprising:

a first display controlling means for receiving image signals and displaying an image on a first display;

a second display controlling means for displaying an operation menu with operational objects included therein in a partial area on a second display;

a reduced image generating means for generating a reduced image of the image displayed by the first image display controlling means;

a third display controlling means for opening a window on the first display and displaying the reduced image on the window;

a specifying means for allowing an operator to select any of certain operational objects from the operation menu displayed on the second display;

a recognizing means for recognizing an image simulation related to the operational object selected by the operator;

a reduced image simulating means for simulating the reduced image generated by the reduced image generating means according to the image simulation recognized by the recognizing means when the operator implements the operational object; and an image switching means for switching the reduced image displayed on the window to the reduced image simulated by the reduced image simulating means.

14. The apparatus for displaying a machine operation guide as defined in claim 13 wherein the recognizing means comprises:

an operation-menu-information storage unit for storing positional information on positions of the operational objects in the operation menu and performance information on performances corresponding to the operational objects; and a recognizing unit for reading performance information of an operational object and outputting the read performance information to a certain controlling means after the operational object is selected by the specifying means.

15. The apparatus for displaying a machine operation guide as defined in claim 14 further comprises:

a related information storage means for storing pairs of an operational object in the operation menu and a preset display field, corresponding to the operational object, for displaying one of a message and a sign for the operator, wherein when a certain operational object is selected by the specifying means the reduced image simulating means reads corresponding one of the message and the sign from the related information storage means and puts the one of the message and the sign into the preset display field on the reduced image generated by the reduced image generating means.

16. The apparatus for displaying a machine operation guide as defined in claim 15, wherein when one of the message and the sign is displayed on the window to urge the operator to implement a certain function, one of the first display controlling means, the second display controlling means, and the third display controlling means visually displays a relation between the one of the message and the sign and the corresponding operational object.

17. The apparatus for displaying a machine operation guide as defined in claim 16, wherein the displayed relation is represented by one of:

a line connecting the one of the message and the sign and the corresponding operational object; and a same color applied to both the one of the message and the sign and the corresponding operational object.

18. The apparatus for displaying a machine operation guide as defined in claim 14 further comprises:

a related information storage means for storing pairs of an operational object in the operation menu and a preset display position where one of a message and a sign for the operator is to be displayed, the preset display position corresponding to the operational object; and a fourth display controlling means for reading from the related information storage means the preset display position corresponding to the operational object selected by the specifying means, and displays the preset display position by visually distinguishing it from the other area on the window opened by the third display controlling means.

19. The apparatus for displaying a machine operation guide as defined in claim 18 further comprises:

a condition judging means for judging whether a certain condition has been satisfied after the fourth display controlling means has displayed the preset display position on the window, the certain condition being one of a state capable of displaying one of the message and the sign for the operator, and an operational object selected by the specifying means, wherein when the condition judging means judges that the certain condition has been satisfied, the reduced image simulating means generates a reduced image by putting the one of the message and the sign into the preset display position on the generated reduced image.

20. The apparatus for displaying a machine operation guide as defined in claim 19 wherein a line connects the operational object and the preset display position.

21. An apparatus for displaying a machine operation guide on a display, comprising:

a first display controlling means for receiving image signals and displaying an image on a display;

a second display controlling means for displaying an operation menu with operational objects included therein in a partial area on the display;

a specifying means for allowing an operator to select one of certain operational objects from the operation menu;

a related information storage means for storing pairs of an operational object in the operation menu and a preset display position where one of a message and a sign for the operator is to be displayed, the preset display position corresponding to the operational object; and a third display controlling means for reading one of a message and a sign corresponding to an operation object from the related information storage means and for putting the one of the message and the sign into the preset display position not overlapping the operation menu on the display and visually displaying a relation between the one of the message and the sign and the operational object after the operation object is selected by the specifying means.

22. The apparatus for displaying a machine operation guide as defined in claim 21, wherein the displayed relation is represented by one of:

a line connecting the one of the message and the sign and the corresponding operational object; and a same color applied to both the one of the message and the sign and the corresponding operational object.

23. An apparatus for displaying a machine operation guide installed on a machine with a first display, the apparatus being connected to another machine installing a second display, comprising:

a first display controlling means for receiving image signals and displaying an image on a first display;

a second display controlling means for displaying an operation menu with operational objects included therein in a partial area on a second display;

a reduced image generating means for generating a reduced image of the image displayed by the first image display controlling means;

a third display controlling means for opening a window in an area not overlapping the operation menu on the second display and displaying the reduced image on the window;

a specifying means for allowing an operator to select one of certain operational objects from the operation menu displayed on the second display;

a recognizing means for recognizing an image simulation related to the operational object selected by the operator;

a reduced image simulating means for simulating the reduced image generated by the reduced image generating means according to the image simulation recognized by the recognizing means when the operator implements the operational object; and an image switching means for switching the reduced image displayed on the window on the second display to the reduced image simulated by the reduced image simulating means.

24. The apparatus for displaying a machine operation guide as defined in claim 23 wherein the recognizing means comprises:

an operation-menu-information storage unit for storing positional information on positions of the operational objects in the operation menu and performance information on performances corresponding to the operational objects; and a recognizing unit for reading performance information of an operational object and outputting the read performance information to a certain controlling means after the operational object is selected by the specifying means.

25. The apparatus for displaying a machine operation guide as defined in claim 24 further comprises:

a related information storage means for storing pairs of an operational object in the operation menu and a preset display field, corresponding to the operational object, for displaying one of a message and a sign for the operator, wherein when a certain operational object is selected by the specifying means the reduced image simulating means reads corresponding one of the message and the sign from the related information storage means and puts the one of the message and the sign into the preset display field on the reduced image generated by the reduced image generating means.

26. The apparatus for displaying a machine operation guide as defined in claim 25, wherein when one of the message and the sign is displayed on the window to urge the operator to implement a certain function, one of the first display controlling means, the second display controlling means, and the third display controlling means visually displays a relation between the one of the message and the sign and the corresponding operational object.

27. The apparatus for displaying a machine operation guide as defined in claim 26, wherein the displayed relation is represented by one of:

a line connecting the one of the message and the sign and the corresponding operational object; and a same color applied to both the one of the message and the sign and the corresponding operational object.

* * * * *